Sept. 24, 1968 R. L. DAY 3,402,944
SLIDE BED FOR TRUCKS
Filed March 29, 1967 3 Sheets-Sheet 2
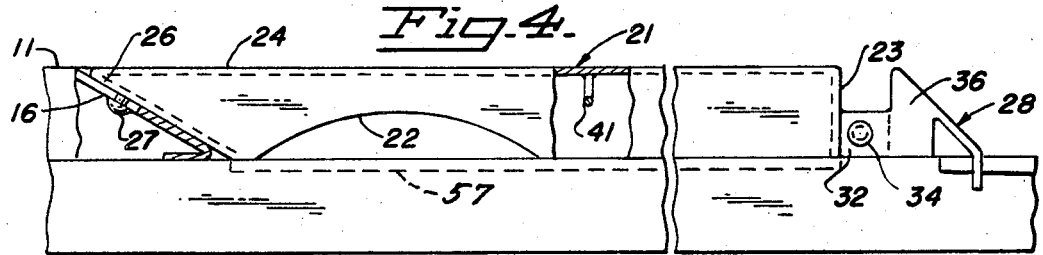
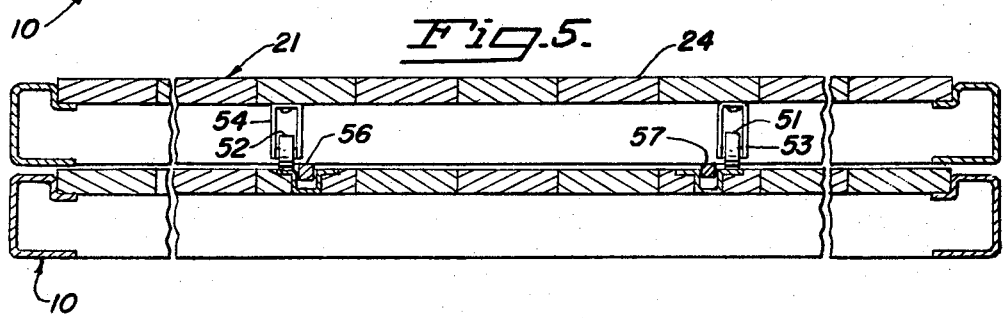
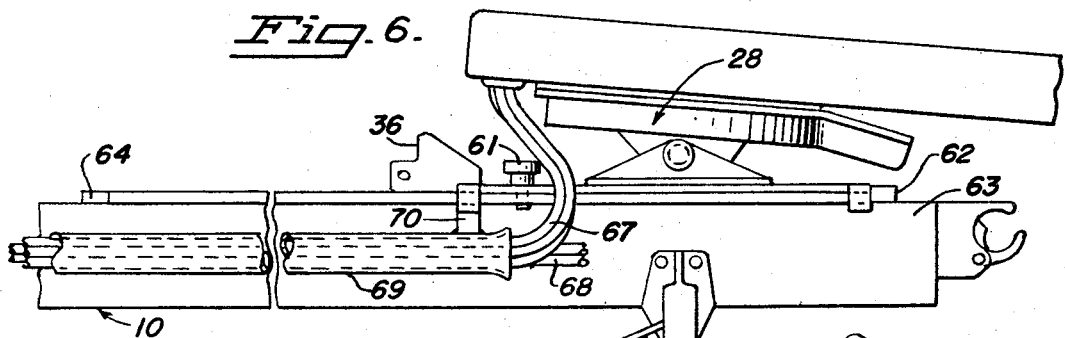
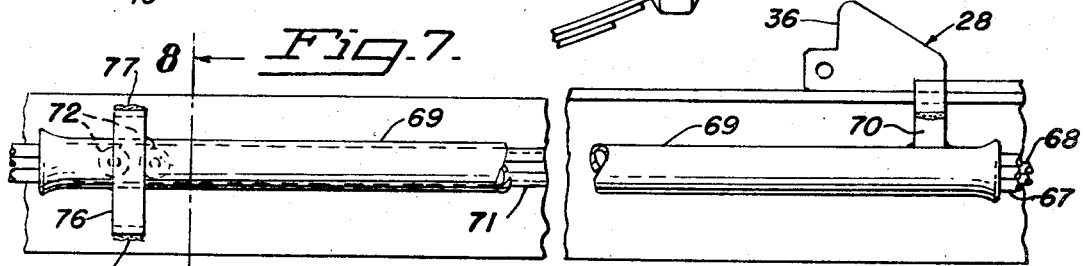
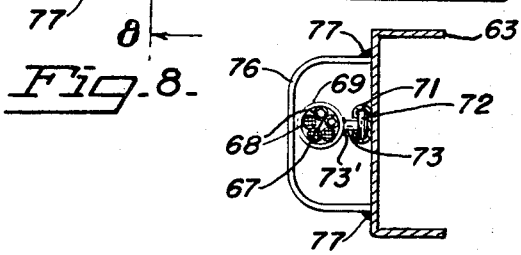
INVENTOR
RONALD L. DAY
BY
Arlington C. White
ATTORNEY Sept. 24, 1968   R. L. DAY   3,402,944
SLIDE BED FOR TRUCKS
Filed March 29, 1967   3 Sheets-Sheet 3
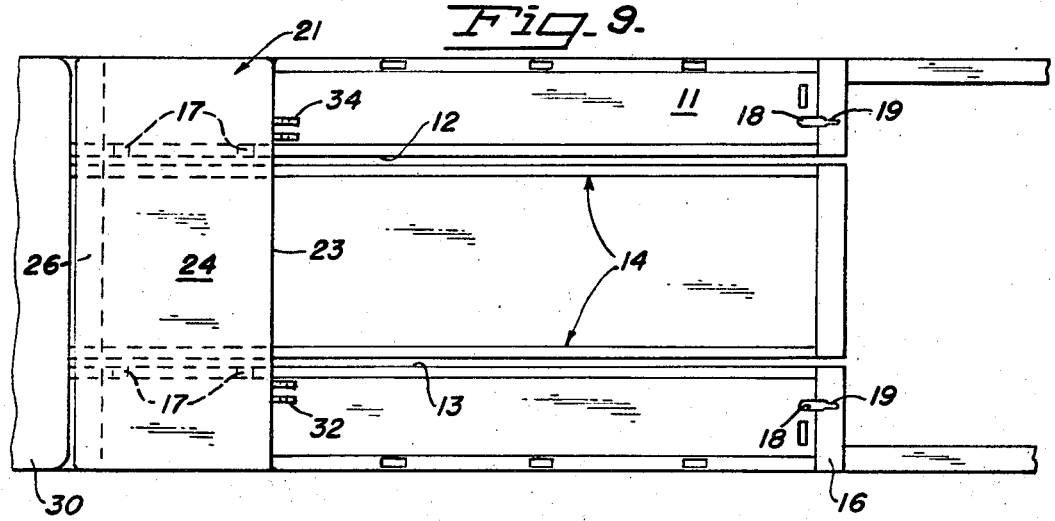
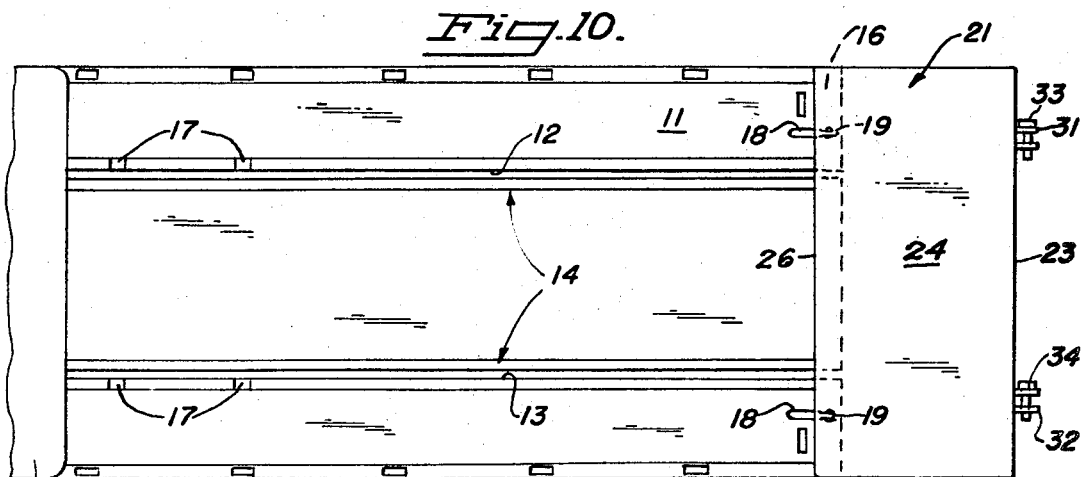
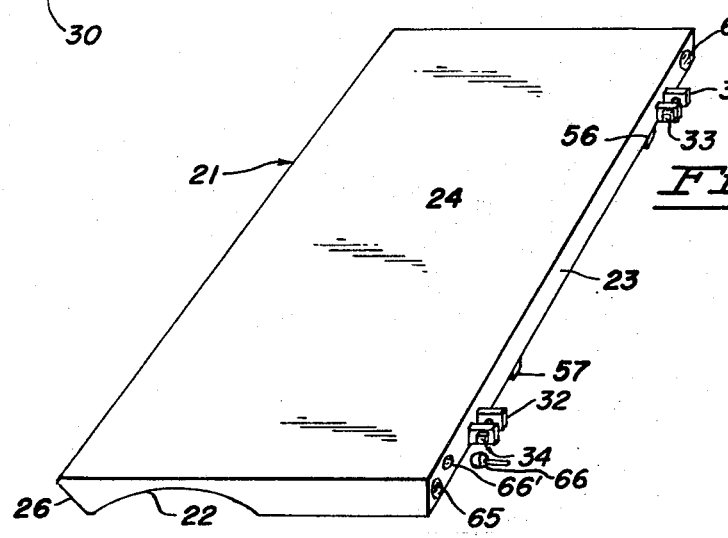
INVENTOR
RONALD L. DAY
BY
ATTORNEY

# United States Patent Office 3,402,944
Patented Sept. 24, 1968

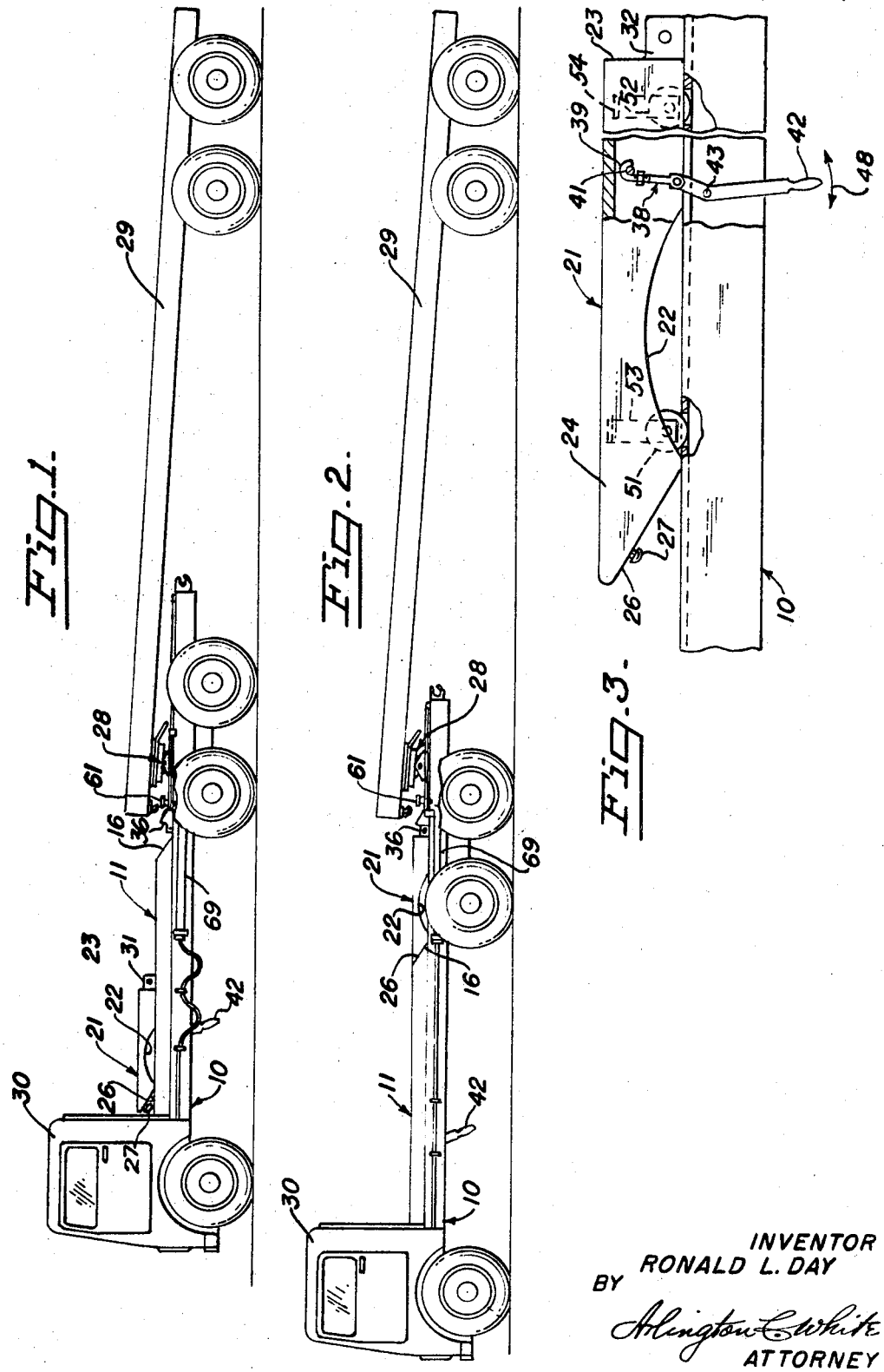

3,402,944
SLIDE BED FOR TRUCKS
Ronald L. Day, 856 34th Ave.,
Oakland, Calif. 94601
Filed Mar. 29, 1967, Ser. No. 626,836
9 Claims. (Cl. 280—423)

ABSTRACT OF THE DISCLOSURE

A slide bed having rollers thereunder and releasably securable in an inoperative position on the main bed of the truck of a tractor trailer vehicle. The main bed being provided with a track for guiding the slide bed to its operative position in mating engagement with the rear end of the main bed to serve as an extension thereof. A fifth wheel coupler releasably securable to the rear of the slide bed and slidably mounted on the main bed to permit selective elongation of the tractor trailer vehicle simultaneously with the extension of the main bed.

---

The invention, in general, relates to the transportation art and more particularly relates to an improved construction for tractor-trailer combination to afford increased loads.

Heretofore in the art, various types of devices and equipment have been devised for effecting increased main bed space on trucks. While such prior devices and equipment have for the most part been effective in accomplishing the object of increased space, the majority of such prior devices and equipment are disadvantageous not only because the initial installation or the addition to existing vehicles of such equipment is costly and economically prohibitive in some instances, but also because more than one operator is required to set up the component parts to effect the additional space as well as to take down the parts to reduce the space to that of the main bed of the truck. The foregoing as well as other disadvantages of prior devices and equipment of this general nature are obviated by my present invention which is directed to the provision as well as removal of the added space components by the effort of but a single vehicle operator.

A primary object of my invention is to provide a slide bed for trucks which at the will of a single vehicle operator can afford additional flat space as an extension of the main bed of a truck or tractor.

Another important object of the invention is to provide a slide bed of the indicated nature which is additionally characterized by its versatility in providing either a truck and trailer unit, or a tractor semi with a drom, or a true tractor and trailer.

A still further object of my present invention is to provide a slide bed for trucks of the aforementioned character which is relatively inexpensive to install in operative position as well as to remove to afford a standard main bed of the truck.

Other objects of the invention, together with some of the advantageous features thereof, will appear from the following description of a preferred embodiment of the invention which is illustrated in the accompanying drawings.

Referring to the drawings:

FIG. 1 is a side elevational view of a prefererd embodiment of the invention seated on a main bed of a truck in inoperative position.

FIG. 2 is a side elevational view of the embodiment of my invention locked in operative position at the rear and as an extension of the main bed of a truck.

FIG. 3 is an enlarged, broken perspective view of the preferred embodiment of the invention on a truck, parts being broken away and shown partly in section to illustrate the slide bed locking elements.

FIG. 4 is an enlarged broken side elevational view of a preferred embodiment of my invention latched in operative position at the rear of a truck.

FIG. 5 is an enlarged transverse sectional elevational view of the preferred embodiment of the invention; this view showing the track and rollers of the slide bed riding thereon.

FIG. 6 is a broken side elevational view of the fifth wheel coupler connecting the truck and trailer and employed in the preferred embodiment of the invention.

FIG. 7 is a broken side elevational view of a cable conduit employed in the preferred embodiment of my invention as disposed and supported on the frame of the fifth wheel coupler.

FIG. 8 is a sectional elevational view taken on the line 8—8 of FIG. 7.

FIG. 9 is a broken top plan view of the bed of the truck and slide bed seated thereon.

FIG. 10 is a view similar to FIG. 9 but with the slide bed in operative position at the rear of the truck.

FIG. 11 is a perspective view of a preferred embodiment of the invention.

In its preferred form, the slide bed for trucks of my present invention preferably comprises, in combination with the main bed of a tractor as well as a trailer fifth wheel coupler, a recessed track on said main bed, a rearwardly and downwardly inclined rear end on said main bed, together with a slide bed movable on said track from adjacent the front end of said main bed, a rearwardly and downwardly inclined front end on said slide bed for matching said rearwardly and downwardly inclined rear end of said main bed, means for locking said slide bed in an inoperative position adjacent to the front end of said main bed, and means for removably latching said slide bed in operative position to said rear end of said main bed as well as to said fifth wheel coupler with the front of said slide bed engaging the rear end of said main bed and serving as an extension thereof.

In accordance with the present invention, I initially modify the standard main bed of a tractor or truck 10 by providing in the upper surface of said main bed, which is designated in the annexed drawings by the reference numeral 11, a pair of recesses or grooves 12 and 13 which are arranged in spaced relationship to one another and which extend longitudinally of the tractor main bed 11 to define a track 14 thereon. I also bevel the rear of the main bed of the truck or tractor 10 to provide thereon a rearwardly and downwardly extending rear end 16 for the full thickness of the main bed as clearly shown in FIG. 3 of the drawings. The main bed 11 is further modified by fashioning a plurality of holes 17 therein, adjacent to the forward end of the main bed arranged in spaced pairs in the recesses 12 and 13 in FIGS. 9 and 10, as well as a pair of spaced apart slots 18, which narrow to slits 19 at the rear of the main bed outside of the recesses 12 and 13; such slot 18 and merging slit 19 extending partially into the rearwardly and downwardly extending rear end 16 of the tractor's main bed 11. As will be hereinafter explained, these slots 18 with their merging narrow slits 19 serve to removably latch my slide bed in operative position, at the rear of and as an extension of the main bed 11 of the truck 10.

As illustrated in FIGS. 1 and 2 of the annexed drawings, I provide a slide bed 21 for affording additional floor space on the tractor or truck 10 thereby affording increased pay loads and an over-all extension of the tractor and trailer combination where permitted under the laws of different states. The slide bed 21 can be constructed from lumber or light gauge steel as desired, together with hooks, binders and lights hereinafter described, and is made to the same general thickness as the main bed 11 with a cut-out section as defined by the arcuate central portion 22, to afford clearance for the truck tires. As shown in enlarged view in FIG. 4, the rear end 23 of the slide bed is formed to a right angle and to a depth that brings the flat upper surface 24 of the slide bed flush with the upper surface of main bed 11 of the truck or tractor 10. The front end of the slider 21 is beveled to complement the beveled rear end 16 of the main bed 11 and to provide a rearwardly and downwardly inclined front end 26 on the slide bed. A pair of fastening elements, conveniently in the form of round headed hooks 27, are secured in the front end 26 of the slide bed for cooperating with the slot 18 and slit 19 formed in the rear of the main bed 11 when the slide bed is moved to the rear of the main bed and brought to rest in operative position between the rear end 16 of the main bed 11 of the truck and a sliding fifth wheel coupler 28 mounted on the truck 11 and to which the trailer 29 is coupled. It will be noted that as the slide bed 21 slides into operative position, the enlarged head of each of the hooks 27 enters each slot 18 at the rear of main bed 11 of the truck and passes into each merging narrow slit 19 to latch the front end of the slide bed 21 to the main bed 11, with the downwardly and rearwardly inclined rear end 16 of the main bed in mating engagement with the rearwardly and downwardly inclined front end 26 of the slide bed 21, as clearly illustrated in FIG. 4 of the annexed drawings, and with the upper surface 24 of the slide bed flush with the upper surface of the main bed 11 of the tractor 10 and constituting a flat extension thereof. When the slide bed 21 is returned to its inoperative position at the forward end of the main bed 11 and adjacent the cab 30 of the tractor or truck 10, the rollers on the bottom of the slide bed hereinafter described, fit into the holes 17 to center the slide bed with the bottom of the slide bed engaging the upper surface of main bed 11 of the truck 10.

A pair of suitable apertured lugs 31 and 32 are fastened to and project from the rear end 23 of the slide bed in transverse spaced relationship to one another, as shown in FIG. 11 for passing pins 33 and 34, respectively, which also pass through apertures of adjacently arranged upstanding transversely aligned brackets or blocks, of which but the block 36 is shown in the drawings, which are fabricated of steel and secured to the fifth wheel coupler 28 so as to rigidly fasten down the slide bed 21 at the rear thereof in operative position as an extension of the flat main bed 11 of the tractor.

In order to lock the slide bed 21 in an at rest or inoperative position at the forward end of the truck 10, I provide a binder 38 on each side of the truck, of which but one is shown in the drawings. Each binder 38 is formed with a curved upper end 39 for engaging over a locking pin 41 which is fastened to a side of the main bed 11, and I provide an actuating means for moving each binder 38 into and out of engagement with each locking pin 41 comprising a hand lever 42 which is pivotally connected by means of a short pin 43 to the binder 38. As indicated by the double arrow 48 in FIG. 4, the hand lever may be thrown in one direction to close the lock or effect engagement of binder 38 with locking pin 41 to hold the slide bed 21 in an at rest position on the main bed 11, and the hand lever 42 may be thrown in the opposite direction to unlock the slide bed for movement to its operative position along the track 14 on main bed 11. As shown by dotted lines in FIG. 3, and in full lines in FIG. 5 suitable rollers or casters 51 and 52 are journaled in depending brackets 53 and 54, respectively, fastened to the underside of the slide bed 21 to facilitate movement thereof along the main bed 11; the rollers 51 and 52 being so arranged and spaced as to ride adjacent to the recessed grooves 12 and 13 in the main bed 11 constituting the track 14, and coming to rest in the holes 17 adjacent the cab of the truck. A second pair of brackets 56 and 57 are secured to and depend from the bottom of slide bed 21 and serve as guides or slides for the rollers 51 and 52 as well as to prevent unseating of the rollers or dislodgement thereof from track 14.

While not a part of my invention per se, the sliding fifth wheel coupler 28 which I preferably employ in my truck or tractor and trailer combination on which my slide bed 21 is movably mounted is the coupler described and claimed in expired U.S. Letters Patent No. 2,456,826, entitled Trailer Coupler, granted Apr. 11, 1946 to John P. K. Fontaine. This coupler is mounted on the rear end of truck 10 for sliding movement and includes a locking pin 61 for locking and unlocking the coupler in and from operative position to the truck or tractor 10 between the same and trailer 29 to prevent its movement. When the slide bed 21 of my present invention is used to enlarge the floor space, the fifth wheel coupler 28 after having been moved rearwardly, is connected to the rear end 23 of the slide bed by means of the lugs 31 and 32 thereon, the pins 33 and 34, and the brackets 36 on the fifth wheel coupler, all as hereinabove described and as illustrated in the accompanying drawings. The space for the slide bed 21 is provided by sliding the fifth wheel coupler towards the rear of the track 10, after unlocking the same by raising pin 61, by driving the truck forward with the trailer brakes on only.

Assuming that slide bed 21 is locked in an inoperative position as shown in FIG. 1, adjacent to the cab 30 of the truck or tractor 10 and that the length of the tractor and trailer over-all is sixty feet which is the maximum length permitted in many states for this type of transport vehicle. Assume, further, that it is desired to lengthen this combination to an over-all sixty-five feet which is permissable in many states. The slide bed 21 is made to a length of six feet to insure that when it is moved to its operative position between the truck 10 and the trailer 20, the maximum allowable length of the combination will not exceed sixty-five feet. The six foot over-all length of the slide bed is reduced to an over-all length of five feet because of its beveled front end. To effect the enlargement to the sixty-five feet over-all, the operator first locks the brakes, not shown, on the trailer 29 which are connected into the air brake system, also not shown, employed on the combined truck and trailer. The operator then drives the combination forward until the fifth wheel coupler stops at its extreme position by engaging the abutment or stop 62 on the frame 63 of truck 10 and the coupler is locked in its rearward position. The operator then unlocks the two binders 38 at opposite sides of truck 10 to unlock the slide bed 21. The operator then raises the rollers 52 and 53 from holes 17 and manually pushes the slide bed 21 along track 14 on main bed 11 of the truck to the end of the main bed at which point the slide bed tilts and slides down the rearwardly and downwardly inclined rear end 16 of the main bed 11 to its final resting position with hook 27 first engaging in slot 18 and then the narrow slit 19 to latch the slide bed in operative position with the rearwardly and downwardly inclined front end 26 of the slide bed 21 in mating engagement with the complementary rear end 16 of the main bed 11 of the truck. The operator finally locks the slide bed 21 in operative position as an extension of main bed 11 by passing pins 33 through the aligned apertures in lugs 31 and 32 of the slide bed and the upstanding aligned brackets 36 of the fifth wheel coupler 28.

To return the slide bed 21 to initial or at rest position on the main bed 11 of truck 10 adjacent the cab 30, and thus reduce the over-all length of the truck and trailer combination from sixty-five feet to sixty feet, the operator first removes the two pins 33 at the rear of the slide bed and with the trailer brakes locked, the operator backs the tractor 10 against the steel blocks 36. This rearward movement of the tractor against the push blocks 36 will cause the slide bed to lift up, thereby disengaging the hooks 27 from the slot 18, and to slide partially up onto the rear end of the main bed 11 of the tractor with forward rollers of the slide bed riding on track 14. The operator then manually pushes the slide bed along the track 14 to its final resting place near the cab 30 with the rollers of the slide bed dropping partially into the holes 17 in track 14 to latch the slide bed with its bottom engaging the upper surface of main bed 11. The operator finally throws the two crank levers 42 on opposite sides of the truck to bring the binders 38 and their hooked ends 39 into engagement with pins 41, thus locking the slide bed in its inoperative position. The fifth wheel coupler has moved in this operation to its initial position against forward stop 64 and the pin 61 is dropped into position again to lock the coupler in its forward position on the truck 10.

The rear end of the slide bed 21 is provided with tail lights 65 at each side thereof, which are connected into the electrical circuit, not shown, for the truck and trailer; such lights 65 being placed into and removed from the electrical circuit by means of a plug 66 carried on a short lead, also not shown, connected into the circuit. A suitable socket 66' is provided in the rear 23 of the slide bed 21 for receiving the plug when the slide bed has been connected in operative position at the rear of the main bed 11 of the truck 10; the plug 66 being withdrawn from the socket 66' prior to the raising and return of the slide bed to its inoperative position adjacent to the cab 30.

In order to prevent the electrical line 67 and the air line 68, see FIG. 7 of the drawings, from being dragged along the road because of the approximately five feet to six feet slack developed therein when the truck and trailer combinations is reduced to an over-all length of 60 feet, I provide a cable conduit 69 for receiving and holding such electrical and air lines. The cable conduit 69 is secured to the fifth wheel coupler 28 by means of a bracket 70 depending from the frame of the coupler and fastened to one end of the conduit. The opposite end of the cable conduit 69 is slidable in a track 71 by means of rollers 72 which are carried on a stem 73 that is welded, as at 73', to the cable conduit at that end; such track 71 being fixedly mounted on the frame of the truck. In moving the truck relative to the trailer to effect a shifting of the fifth wheel coupler 28 when providing or taking up the space therebetween for the mounting of the slide bed 21 at the rear and as an extension of the main bed 11 of the truck, as well as for the removal of such slide bed from the rear of the main bed of the truck, the rollers 72 on the cable conduit 69 move back and forth on the track 71 on the frame of the truck. Since the electrical line 67 and the air line 68 pass through the cable conduit 69, the slack created in these two lines when the slide bed 21 has been returned to its inoperative position just behind the cab 30 of the truck 10 will be supported by the conduit and will not drag along the road, see FIG. 1 of the annexed drawings. When the slide bed 21 is in its operative position at the rear of the main bed 11 of the truck, the two lines 67 and 68 are tautened inside of the cable conduit 69, as indicated by the dotted lines in FIG. 7. To avoid damage to the cable conduit 69 from possible dislodgment thereof from the track 71, and a consequent damage to the electrical and air lines, I provide a safety guard or shield 76 which surrounds the conduit 69, the track 71 and the rollers 72; such guard being open at both ends and being conveniently secured by means of welding, as at 77, to the frame of the truck frame 63.

By virtue of the present invention and as embodied in the combination hereinabove described, additional bed space is readily provided on a truck whenever permitted by law; and versatility of combinations is afforded in that truck and tractor units can be converted into a truck and trailer combination of variable over-all length, or to a tractor and a drom, or to a true truck and trailer combination at the will of the operator. These entire changes, it is to be especially noted, can be accomplished by the effort of but a single operator.

I claim:
1. A slide bed for trucks comprising in combintaion with a truck including a main bed and a trailer including a fifth wheel coupler slidably mounted between the truck and the trailer, a track on said main bed, a rearwardly and downwardly inclined rear end on said main bed, a slide bed of predetermined dimensions mounted on said main bed and serving as an extension thereof, means on said slide bed for locking the same in an inoperative position, rollers journaled on said slide bed and riding on said track for enabling movement of said slide bed on said main bed to the rear thereof, a rearwardly and downwardly inclined front end on said slide bed for mating engagement with the rear end of said main bed, a pair of apertured lugs projecting from the rear end of said slide bed, a pair of apertured blocks on said fifth wheel coupler in alignment with said apertured lugs on said slide bed, and locking pins extending through the apertures of said lugs and said blocks to lock the slide bed in operative position between the trailer and the truck as an extension of said main bed.

2. In combination with a truck and trailer combination, a main bed on said truck having a pair of longitudinally extending recesses therein arranged in parallel relationship to one another defining a track, a rearward and downwardly inclined rear end on said main bed, a fifth wheel coupler slidably mounted on said tractor, for detachably connecting said trailer to said truck, and means for enlarging said main bed of said truck; said means comprising a slide bed removably disposed in operative position between said truck and said trailer and detachably connected to said rear end of said main bed of said truck and said fifth wheel coupler to constitute an extension of said main bed, and means latching said slide bed in an inoperative position on said main bed.

3. A slide bed for trucks as defined in claim 1, and a hook depending from said slide bed; said main bed having an elongated slot and narrow merging slit adjacent to and extending into the rear end thereof for the receiption of said depending hook of said slide bed.

4. The combination defined in claim 1 wherein said means latching said slide bed in an inoperative position on said main bed comprises a latching pin projecting from said main bed at opposite sides thereof, a binder having a curved upper end for engaging said latching pin, and means for actuating said binder comprising a lever pivotally connected to said binder, movement of said lever in one direction effecting engagement of said curved upper end of said binder with said latching pin while movement of said lever in the opposite direction effects disengagement of said binder from said latching pin.

5. The combination defined in claim 2, and a pair of stops mounted on said tractor and arranged on opposite sides of said fifth wheel coupler for limiting the sliding movement of said coupler in both directions.

6. A slide bed as defined in claim 1, and guides fastened to and depending from the bottom of said slide bed adjacent to said rollers for inhibiting dislodgement of said rollers from said track.

7. A slide bed as defined in claim 1, and a pair of stops mounted on said truck and arranged on opposite sides of said fifth wheel coupler for limiting the sliding movement of said coupler in both directions.

8. In a truck and trailer combination of variable overall length including a fifth wheel coupler connecting said truck and trailer as defined in claim 1, a cable conduit for passing and holding electrical and air lines in both slackened and tautened conditions, means securing one end of said cable conduit to the fifth wheel coupler, and means mounting the other end of said cable conduit for relative movement in respect to the frame of said truck.

9. In a truck and trailer combination defined in claim 8, and a safety guard surrounding said cable conduit and rigidly fastened to the frame of said truck.

References Cited

UNITED STATES PATENTS

| | | | |
|---|---|---|---|
| 2,783,080 | 2/1957 | Ringsby | 280—423 X |
| 3,127,194 | 3/1964 | Jeffries | 280—421 |
| 3,360,280 | 12/1967 | Betchart | 280—407 |

LEO FRIAGLIA, *Primary Examiner.*